(No Model.)
J. HARRISON.
CRANK FOR VELOCIPEDES.
No. 381,547. Patented Apr. 24, 1888.
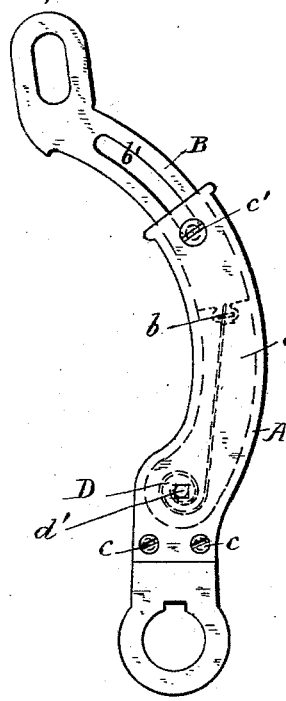 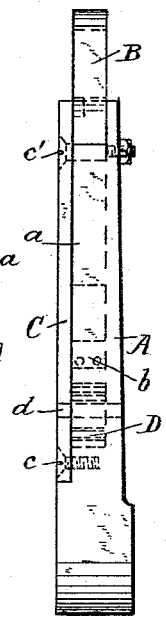 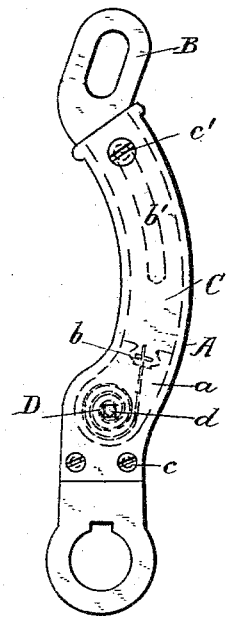
Witnesses,
L. B. Porter.
W. D. Porter.
Inventor.
John Harrison.
By his Attorney
Herbert W. T. Jenner.

United States Patent Office.

JOHN HARRISON, OF WINCHESTER, COUNTY OF HANTS, ENGLAND.

CRANK FOR VELOCIPEDES.

SPECIFICATION forming part of Letters Patent No. 381,547, dated April 24, 1888.

Application filed December 13, 1887. Serial No. 257,792. (No model.) Patented in England February 4, 1886, No. 1,685.

*To all whom it may concern:*

Be it known that I, JOHN HARRISON, a citizen of Great Britain, residing at Winchester, in the county of Hants, England, have invented certain new and useful Improvements in Velocipede-Cranks, (English Patent No. 1,685, dated February 4, 1886;) and I do hereby declare the following to be a full, clear, and exact description of the invention, such as will enable others skilled in the art to which it appertains to make and use the same.

This invention relates to cranks for velocipedes; and it consists in constructing the crank so that its throw shall automatically increase during the downward stroke and automatically decrease during the upward stroke, as hereinafter fully described and claimed.

In the drawings, Figure 1 is a side view of a left-hand crank. Fig. 2 is a front view of the same, and Fig. 3 is a side view showing the crank fully extended.

A is the body of the crank, provided with a hole at one end, having a keyway for securing the crank to the axle in the ordinary manner. The crank is curved, and is provided with the curved longitudinal slot $a$ in one side of it.

C is a cover-plate secured to the crank by the screws $c\ c\ c'$.

B is a curved arm fitting the said slot in the crank, and provided with the curved slot $b'$, which works over the said screw $c'$, which screw limits the motion of the arm in the slot of the crank. The arm B is provided with an elongated hole at its outer end for the attachment of the pedal-pin in the ordinary manner. A lug, $b$, is provided on the inner end of the arm.

D is a coiled spiral spring, one end of which is secured to lug $b$ and the other end to the pin $d$, which passes through the crank near the bottom of the slot $a$. The pin $d$ is provided with a square end, $d'$, fitting a square hole in the cover-plate, so that the strength of the spring may be varied and adjusted.

At each downstroke the length of the crank is automatically increased in proportion to the pressure applied to it, as indicated in Fig. 3, and when the pressure is reduced, as in the upstroke, the tension of the spring draws back the arm within the slot, as indicated in Fig. 1.

I do not confine myself to the precise construction described, as it is obvious that my invention may be varied in various ways. For instance, the spring may be made in many of the other forms given to springs, and may be made to operate upon the arm through intermediate mechanism instead of being attached to it direct.

What I claim is—

1. The combination, with a crank, of a sliding arm for carrying the pedal-pin, and a spring for automatically regulating the length of the entire crank and arm in proportion to the pressure applied to the pedal-pin, substantially as set forth.

2. The combination of the crank provided with a longitudinal guide-slot, the arm B, sliding in the slot and provided with the slot $b'$, the pin $c'$, for limiting the motion of the arm, and a spring connected to the arm for retracting it within the guide-slot, substantially as and for the purpose set forth.

3. The combination of the crank provided with a longitudinal guide-slot, the arm B, sliding in the slot, and a spring secured to the crank and to the said arm for retracting the arm within the slot, substantially as and for the purpose set forth.

4. The combination of the crank A, provided with the curved guide-slot $a$, the curved arm B, provided with the slot $b'$, and sliding in the guide-slot, the pin $c'$, limiting the movement of the arm, the cover-plate C, the screws $c$, and the spiral spring D, for retracting the arm within the slot, substantially as and for the purpose set forth.

In testimony whereof I affix my signature in presence of two witnesses.

JOHN HARRISON.

Witnesses:
HARRY B. DYKE,
E. A. WILLIS,
*Both of 71 High Street, Southampton.*